US012646409B2

(12) United States Patent
Zou

(10) Patent No.: US 12,646,409 B2
(45) Date of Patent: Jun. 2, 2026

(54) INTELLIGENT COCKPIT SYSTEM, VEHICLE CONTROL SYSTEM AND METHOD

(71) Applicants: INVENTEC APPLIANCES CORP., New Taipei City (TW); INVENTEC APPLIANCES (JIANGNING) CORP., Jiangsu (CN)

(72) Inventor: Zheng-Rong Zou, Jiangsu (CN)

(73) Assignees: Inventec Appliances Corp., New Taipei City (TW); Inventec Appliances (Jiangning) Corp., Nanjing (CN)

( * ) Notice: Subject to any disclaimer, the term of this patent is extended or adjusted under 35 U.S.C. 154(b) by 62 days.

(21) Appl. No.: 18/659,529

(22) Filed: May 9, 2024

(65) Prior Publication Data

US 2025/0209916 A1 Jun. 26, 2025

(51) Int. Cl.
*G08G 1/0967* (2006.01)
*H04W 4/44* (2018.01)
*H04W 12/03* (2021.01)

(52) U.S. Cl.
CPC . *G08G 1/096725* (2013.01); *G08G 1/096783* (2013.01); *H04W 4/44* (2018.02); *H04W 12/03* (2021.01)

(58) Field of Classification Search
CPC ...... G08G 1/096725; G08G 1/096783; H04W 4/44; H04W 12/03
See application file for complete search history.

(56) References Cited

U.S. PATENT DOCUMENTS

| | | | | |
|---|---|---|---|---|
| 2022/0311751 A1* | 9/2022 | Li | | H04L 12/40006 |
| 2022/0366032 A1* | 11/2022 | Ben-Noon | | H04L 63/1425 |
| 2023/0063354 A1* | 3/2023 | Sun | | B60W 60/0015 |
| 2024/0233451 A1* | 7/2024 | Lu | | G07C 5/008 |

(Continued)

FOREIGN PATENT DOCUMENTS

| | | |
|---|---|---|
| CN | 112185168 A | 1/2021 |
| CN | 112543927 B | 3/2023 |
| CN | 116800531 A | 9/2023 |

(Continued)

OTHER PUBLICATIONS

Office Action mailed to Corresponding Taiwanese Patent Application No. 113102062 dated Dec. 30, 2024.

*Primary Examiner* — Tan Q Nguyen
(74) *Attorney, Agent, or Firm* — Rosenberg, Klein & Lee

(57) ABSTRACT

An intelligent cockpit system comprises an intelligent cockpit module, a vehicle networking module and a cross-domain gateway module. The vehicle networking module is configured to communicate with an external device through C-V2X network. The external device has a road side unit. The cross-domain gateway module is respectively connected with the vehicle networking module and the intelligent cockpit module. The cross-domain gateway module is configured to communicate with an in-vehicle control terminal which has an automatic driving control terminal and/or a vehicle body control terminal. Wherein, the intelligent cockpit module is configured to communicate with the external device through the cross-domain gateway module and the vehicle networking module, and communicate with the in-vehicle control terminal through the cross-domain gateway module.

9 Claims, 5 Drawing Sheets

(56)         References Cited

U.S. PATENT DOCUMENTS

2025/0164649 A1*   5/2025   Jia ..................... H04L 12/40169
2025/0276730 A1*   9/2025   Wang .................... B62D 1/046

FOREIGN PATENT DOCUMENTS

CN        117022146  A    11/2023
EP          3148236  A1    3/2017
TW        202308411  A     2/2023

* cited by examiner

S100 collecting the external sensing data from the external devices through the vehicle networking module, and the internal sensing data from the internal sensing devices through the automatic driving control terminal by the intelligent cockpit module

S200 calculating the external sensing data and the internal sensing data, generating the vehicle driving control data by the preset automatic driving algorithm model, and obtaining the vehicle driving control signal according to the vehicle driving control data by the intelligent cockpit module

S300 controlling the vehicle actuator according to the vehicle driving control signal by the vehicle body control terminal

FIG. 4

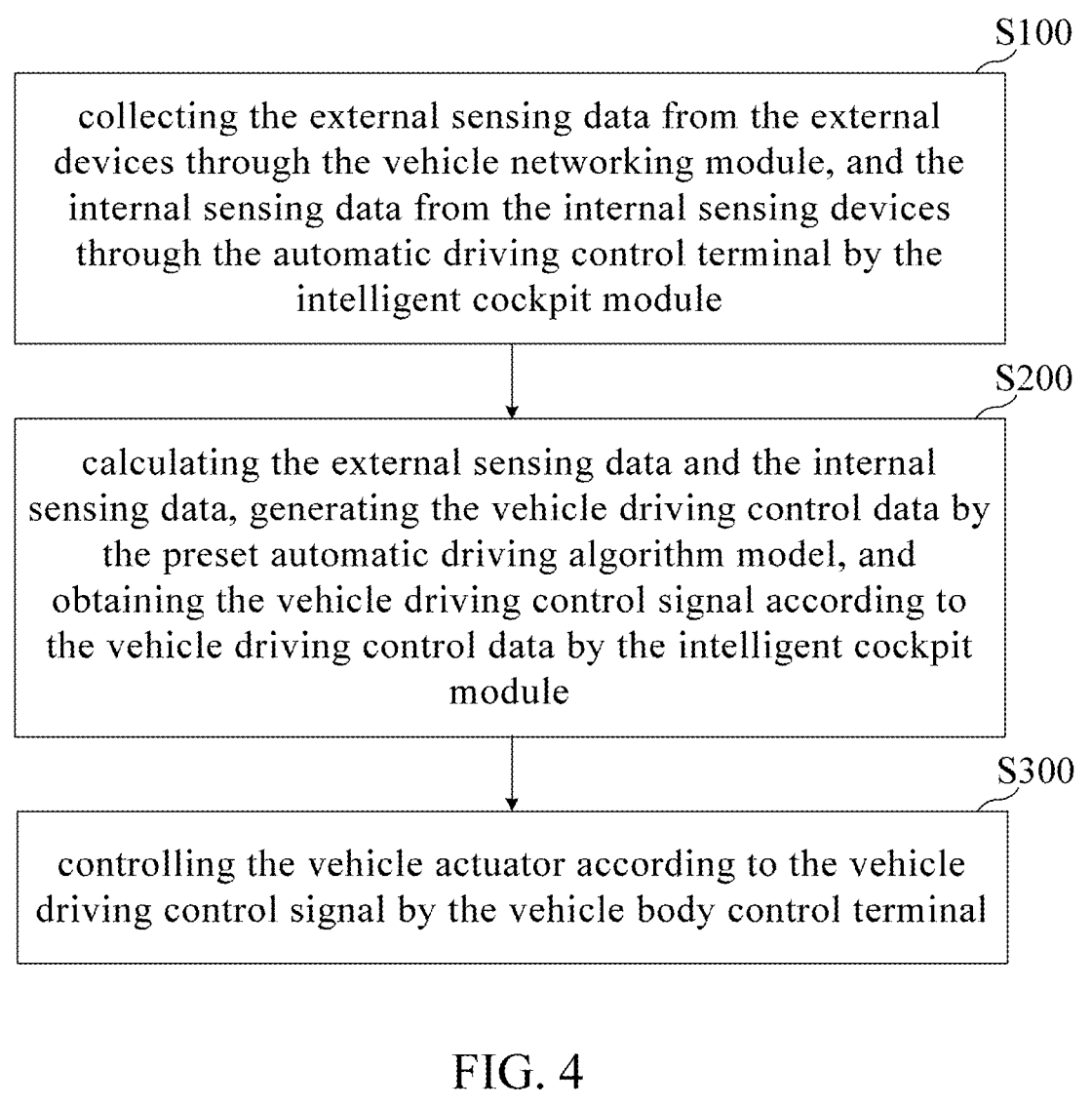

INTELLIGENT COCKPIT SYSTEM, VEHICLE CONTROL SYSTEM AND METHOD

BACKGROUND OF THE INVENTION

1. Field of the Invention

The present invention relates to the field of vehicle control technology, and more particularly, to an intelligent cockpit system, vehicle control system and method integrated into a vehicle control system.

2. Description of the Prior Art

Intelligent connected vehicles, which are based on built-in LTE-4G/5G+C-V2X cellular communication technology, have become the main development and direction of the future automobile industry. Vehicle-road collaboration system is a common requirement for intelligent transportation and intelligent connected vehicles.

To realize intelligent connected vehicles, it is necessary to add 4G/5GC-V2X OBUbox to interactively transmit and control information with surrounding vehicles and road side units. On Board Unit (OBU) is a vehicle-mounted unit with C-V2X technology to use PC5 interface to communicate with RSU/OBU, so as to realize V2V, V2P, V2I and V2N functions in C-V2X to fully support autonomous driving services. However, the existing independent C-V2X OBU technology of the prior art is implanted in intelligent vehicles, which increases complexity and results in poor experience.

In addition, due to the widespread popularity of high-precision maps, vehicles mostly rely on intelligent driving algorithms with powerful AI computing power. The electronic components of the vehicles in the market are divided into several major domains: intelligent network domain, intelligent cockpit domain, automatic driving control domain, vehicle body control domain, etc. Each domain needs to use vehicle-mounted gateways to achieve communication interconnection. However, vehicles need to be equipped with many sensing devices and increase the cost of each vehicle, and lead to the difficulties of promoting and applying intelligent vehicles. In addition, when the automatic driving control system of vehicles in the prior art is used, the automatic driving control system only rely on the vehicle's own radar, camera, etc., which is not efficient to detect quickly and will be easily to misjudge by occlusion, strong light, and extreme weather.

SUMMARY OF THE INVENTION

Therefore, the present invention provides an intelligent cockpit system, vehicle control system and method to solve the problems with the prior art.

In one embodiment of the present invention, the intelligent cockpit system comprises an intelligent cockpit module, a vehicle networking module and a cross-domain gateway module. The vehicle networking module is configured to communicate with an external device through C-V2X network. Wherein, the external device has a road side unit. The cross-domain gateway module is respectively connected with the vehicle networking module and the intelligent cockpit module. The cross-domain gateway module is configured to communicate with an in-vehicle control terminal which has an automatic driving control terminal and/or a vehicle body control terminal. Wherein, the intelligent cockpit module is configured to communicate with the external device through the cross-domain gateway module and the vehicle networking module, and communicate with the in-vehicle control terminal through the cross-domain gateway module.

In summary, the intelligent cockpit system, vehicle control system and method of the present invention integrate the vehicle networking module into the intelligent cockpit module to achieve the integration of the intelligent network domain and the intelligent cockpit domain. At the same time, the intelligent cockpit system can communicate with the vehicle networking module and the in-vehicle control terminal by the cross-domain gateway module, so as to simplify the complexity of the wiring harness design, to reduce the cost of the entire intelligent vehicle and enhance the communication speed to facilitate vehicle control accuracy. In addition, the intelligent cockpit system, vehicle control system and method of the present invention have the following advantages: compared with the prior art, the intelligent cockpit system of the present invention can directly integrate the vehicle networking modules into the intelligent cockpit module to directly realize the HMI human-computer interaction operation in C-V2X application scenarios, and can be easier to upgrade C-V2X OTA software online.

BRIEF DESCRIPTION OF THE APPENDED DRAWINGS

FIG. 4 is a flow chart illustrating a vehicle control method according to the embodiment of the present invention.

DETAILED DESCRIPTION OF THE INVENTION

Figure 1:
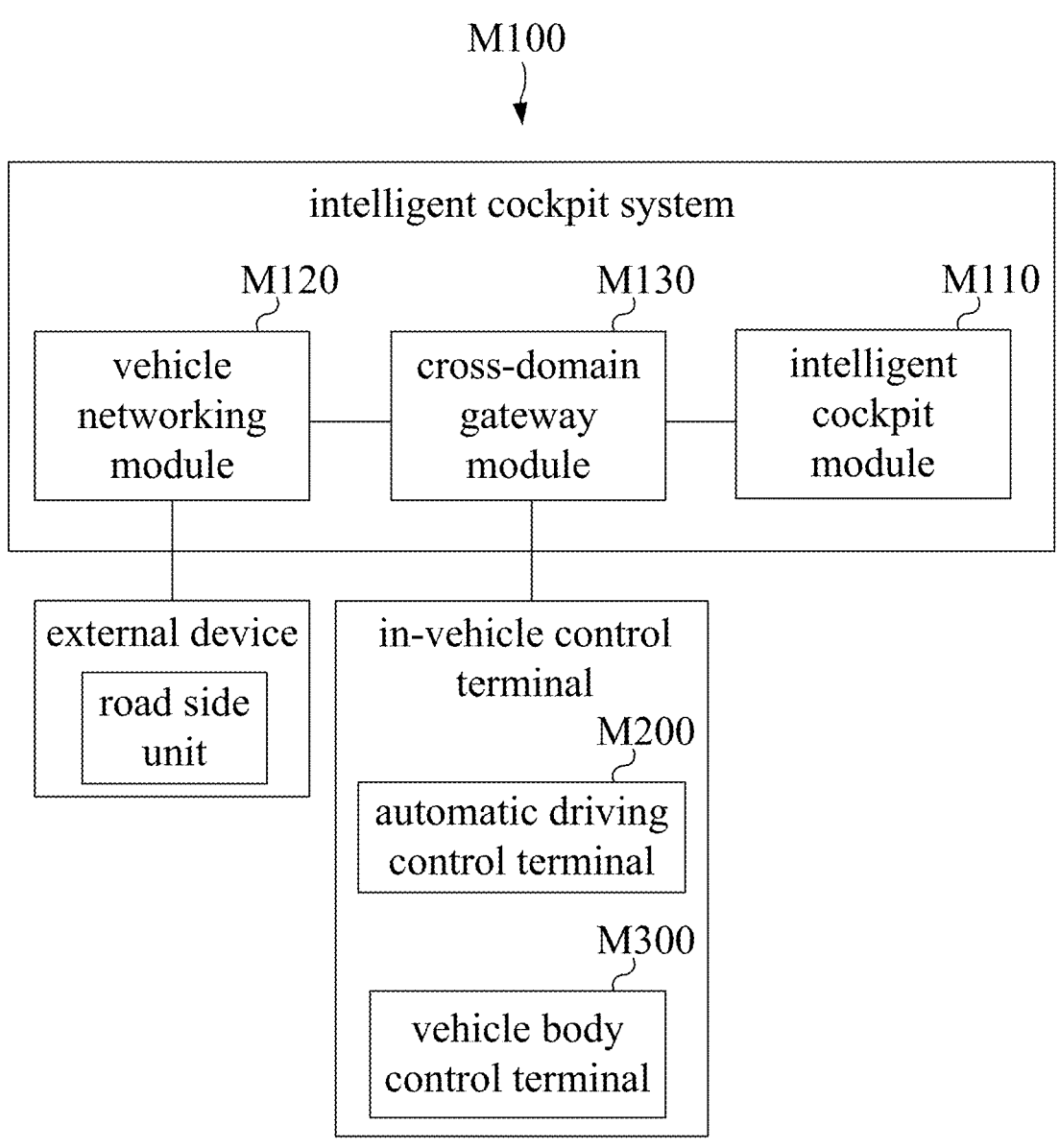
FIG. 1 is a schematic diagram illustrating an intelligent cockpit system according to an embodiment of the present invention.

Please refer to FIG. 1. FIG. 1 is a schematic diagram illustrating an intelligent cockpit system M100 according to an embodiment of the present invention. The intelligent cockpit system M100 of the embodiment of the present invention comprises an intelligent cockpit module M110, a vehicle networking module M120 and a cross-domain gateway module M130. The vehicle networking module M120 is an OBU module, which is configured to communicate with an external device through C-V2X network. Wherein, the external device includes a road side unit and can have vehicle networking modules of other vehicles to communicate directly with each other. The cross-domain gateway module M130 is respectively connected with the vehicle networking module M120 and the intelligent cockpit module M110. The cross-domain gateway module M130 is configured to communicate with an in-vehicle control terminal which has an automatic driving control terminal and/or a vehicle body control terminal. Wherein, the intelligent cockpit module M110 is connected with the vehicle networking module M120 through the cross-domain gateway module M130. The intelligent cockpit module M110 is configured to communicate with the external device through the cross-domain gateway module M130 and the vehicle networking module M120, and communicate with the in-vehicle control terminal through the cross-domain gateway module M130.

Figure 2:
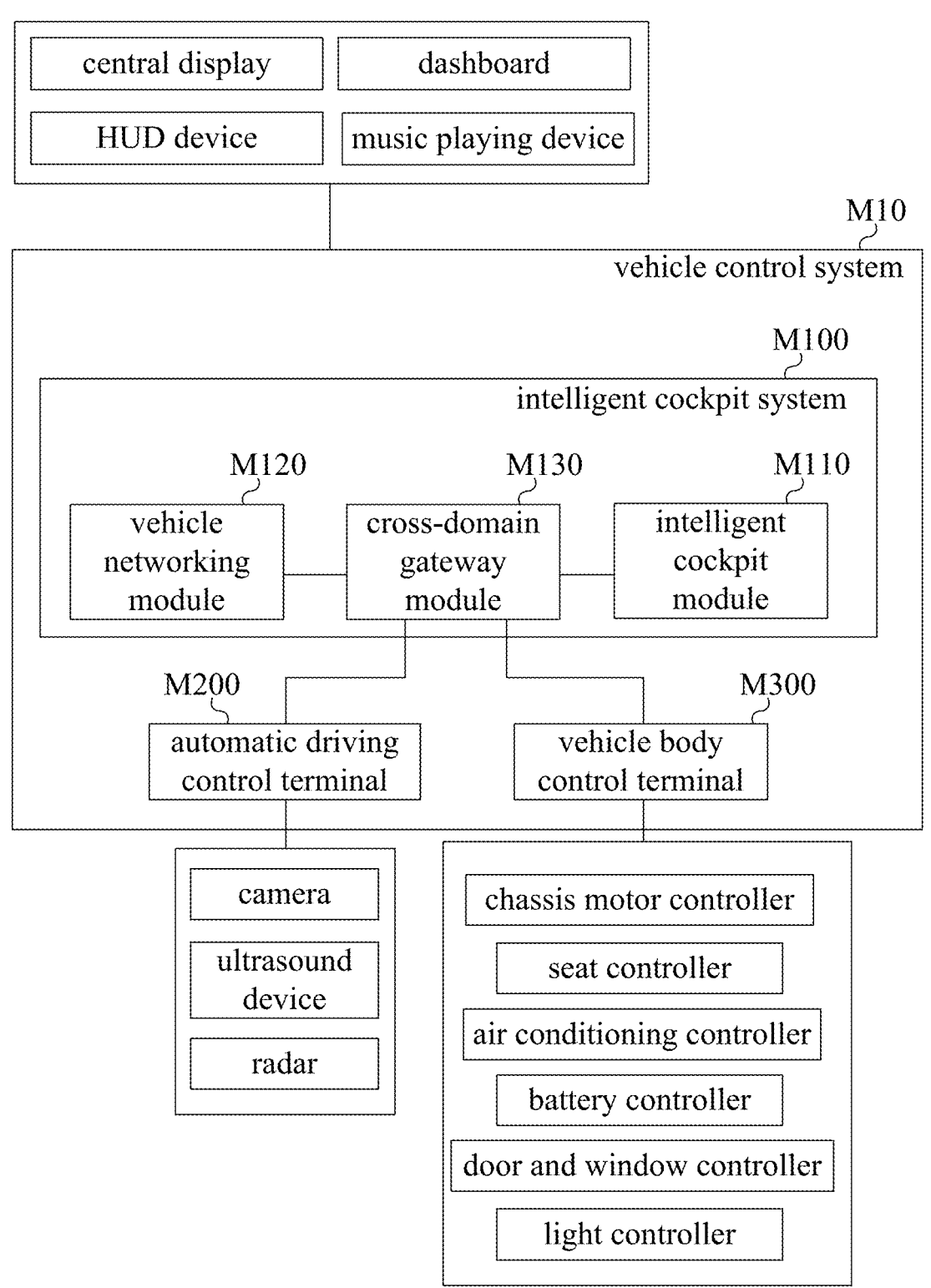
FIG. 2 is a schematic diagram illustrating a vehicle control system according to one embodiment of the present invention.

Please refer to FIG. 2. FIG. 2 is a schematic diagram illustrating a vehicle control system M10 according to one embodiment of the present invention. The vehicle control system M10 of the embodiment of the present invention includes the intelligent cockpit module M110 and further includes an automatic driving control terminal M200 and a vehicle body control terminal M300 respectively connected to the cross-domain gateway module M130. Therefore, the vehicle control system of the present invention is mainly divided into three control domains: intelligent cockpit domain, automatic driving control domain and vehicle body control domain. In practice, each control domain is divided according to the physical integration position in the vehicle to further integrate the network domain control end, so as to enhance the integration capability and centralized cross-domain capability. The intelligent cockpit module M110 acts as a cross-domain gateway which can reasonably allocate data to quickly transmit. Physically, intelligent cockpit module of the present invention can further simplify the complexity of the wiring harness design, thereby reducing the cost of the entire intelligent vehicle.

In practical application, in the embodiment of the present invention of FIG. 2, the intelligent cockpit module M110 collects the external sensing data by the vehicle networking module M120 and collects the internal sensing data by the automatic driving control terminal M200. Next, the intelligent cockpit module M110 calculates the external sensing data and the internal sensing data by the preset automatic driving algorithm model to generate the vehicle driving control data and obtains the vehicle driving control signal according to the vehicle driving control data. The intelligent cockpit module M110 sends the vehicle driving control signal to the vehicle body control terminal M300. The vehicle body control terminal M300 controls the vehicle actuator according to the above vehicle driving control signal, so as to achieve the vehicle automatic driving control function.

Figure 3:
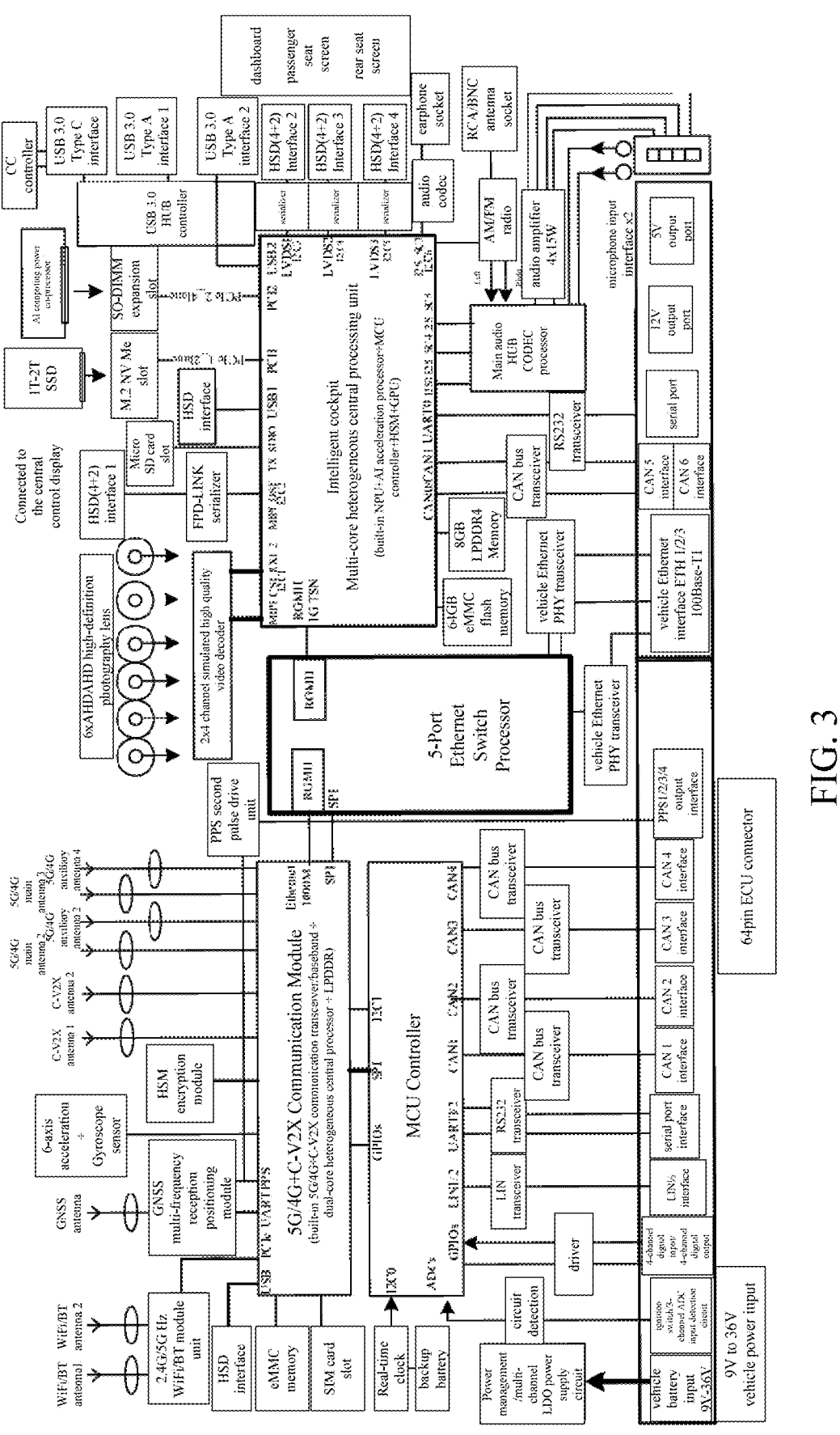
FIG. 3 is a schematic diagram illustrating the detail of the intelligent cockpit system according to the embodiment of the present invention.

Please refer to FIG. 3. FIG. 3 is a schematic diagram illustrating the detail of the intelligent cockpit system according to the embodiment of the present invention. The vehicle networking module further includes a vehicle networking communication control unit and a WiFi/BT module unit. The vehicle networking communication control unit further includes a 5G/4G communication module and a Microcontroller Unit (MCU) controller. Specifically, the 5G/4G communication module is a 5G/4G communication module based on the C-V2X network with built-in 5G/4G+ C-V2X communication transceiver/baseband, and based on high-performance dual-core heterogeneous central processing unit with LPDDR4 memory and NAND Flash running memory. In practice, the 5G/4G communication module supports 5G China Netcom NSA/SA dual networking mode and is compatible with 4G LTE/3G/2G network access, and provides 5G+C-V2X low-latency data concurrency; supports directly running of V2X protocol stack algorithm, supports communicating with Uu communication interface from the base to quickly establish synchronization with the road side unit and the surrounding OBU module, so as to sense road information and surrounding vehicle information detected each road side unit (such as road side radars, millimeter wave radars, perception cameras); the 5G/4G communication module can instantly download high-precision map and obtain various entertainment services from the cloud due to the communication with the V2X Uu communication interface through the 5G cellular network.

Please continue to refer to FIG. 3. The vehicle networking module further includes a Global Navigation Satellite System (GNSS) receiver and an Inertial Measurement Unit (IMU) sensor. In this embodiment, the GNSS receiver is a GNSS multi-frequency receiving positioning module. The GNSS receiver can use the L1+L5 band for positioning at the same time, and supports simultaneous reception of Beidou and GPS dual-mode signals. The GNSS receiver can also provide PPS second pulse output signal for GNSS time synchronization of the C-V2X PC5 communication interface between the surrounding vehicles and roadside units; The GNSS receiver further includes an universal asynchronous receiver/transmitter to provide a data refresh rate of more than 10 Hz, and support the transmission of 10 GNSS raw observation data per second, supporting multi-core heterogeneous central processors to reliably run RTK algorithms, which can effectively improve navigation in complex urban environments, so as to provide accuracy, positioning accuracy down to lane centimeter level.

In practice, the vehicle networking module is also configured to collect a carrier wave phase signal from the GNSS receiver and an IMU measurement data from the IMU sensor. The vehicle networking module further calculates the carrier wave phase signal and the IMU measurement data by an RTC algorithm and a DRIMU positioning algorithm to obtain a current position of the vehicle. The above function can be achieved in the 5G/4G communication module.

In this embodiment, the intelligent cockpit module can be configured in a functional security domain, an information security domain, and an open connection domain. The 5G/4G communication module is configured in the information security domain and the open connection domain. The functional security domain includes the part of the intelligent network connection related to the vehicle data communication. The open connection domain includes the part of the intelligent network connection related to the multimedia data communication. Different domains of the intelligent network connection are securely isolated from each other. The intelligent cockpit module is configured across the information security domain and the open connection domain to control the dashboard, the central control, the passenger seat device, the entertainment device of the rear seat in the vehicle. Wherein, the dashboard and the central control are configured in the information security domain, the entertainment device of the rear seat is configured in the open connection domain. The intelligent cockpit module further includes a computing power expansion unit configured in the information security domain to achieve functions of the automatic assisted driving such as operating, sensing, planning and decision-making by the AI algorithm. The vehicle networking module further comprises an HSM encryption module and a vehicle networking communication control unit configured in the information security domain and connected to the vehicle networking communication control unit. The intelligent cockpit control unit has an expansion slot for accommodating the computing power expansion unit. The WiFi/BT module unit is configured in the open connection domain. The HSM encryption module has a dedicated CPU for processing security requests, and provides the function of a security algorithm accelerator and supports the national encryption algorithms such as SM2, SM3, SM4 and the international common algorithms such as RSA, ECC, SHA, AES, etc., and can be configured to meet the requirements of different levels of Evita HSM (Full, Medium, Light).

The vehicle networking module further includes a SIM card slot unit, an eMMC and NAND flash memory unit, a PPS second pulse drive unit, a real-time clock, a backup battery unit, a 4-channel CAN bus transceiver unit, a 2-channel RS232 transceiver unit, a 1-channel LIN transceiver unit, an ignition switch, a 3-channel ADC input detection circuit unit, a 4-channel digital input unit, a 4-channel digital output unit, an antenna interface, a complete machine power management, and each power supply LDO circuit unit. Wherein, the eMMC NAND Flash memory unit is used to store V2X applications. The SIM card slot unit is used to insert the operator's SIM card. The PPS second pulse drive unit provides the V2X PC5 communication interface with GNSS clock synchronization and the clock synchronization required for peripheral devices, and includes a 4-channel of PPS second pulse. The real-time clock and the backup battery unit are used to provide real-time to the MCU controller. The antenna interface includes a 1-channel mini Fakra input interface for accessing the AHD high-definition camera from the in front of the left and right of the vehicle, a 1-channel mini Fakra interface for accessing a 5G/4G main antenna, a 5G/4G auxiliary antenna with 1 access, a C-V2X main antenna, and a C-V2X auxiliary antenna with 3 access, a 1-channel mini Fakra interface for accessing a 5G/4G auxiliary antenna with 2 access, 5G/4G auxiliary antenna with 3 access, and a 1-channel Fakra interface for accessing a multi-frequency GNSS receiving antenna. The vehicle networking module also supports a 1-channel HSD interface to communicate with a PC to download updates.

The intelligent cockpit module further includes a 4-channel AHD analog high-definition video decoder unit for multiple camera access, an eMMC NAND Flash memory unit, a LPDDR4 memory unit, an USB3.0 HUB controller unit, a main audio HUB CODEC unit, a auxiliary audio CODEC unit, an AM/FM radio unit, a micro SD card slot unit, a SO-DIMM expansion slot unit, an M.2 NVME solid state drive slot unit, an MIPI to LVDS serializer unit, a LVDS1 serializer unit, a LVDS2 serializer unit, a LVDS3 serializer unit, a audio power amplifier unit, a 2-channel CAN bus transceiver unit, a 1-channel RS232 transceiver unit, a 1-channel HSD USB interface unit, and various functional interface units. Wherein, the 4-channel AHD analog high-definition video decoder unit for multiple camera access can further support an external 8-channel AHD analog high-definition camera for receiving data to convert into MIPI-CSI signals, which are directly transmitted through MIPI-CSI interface input of the CPU.

In the present embodiment, the cross-domain gateway module further comprises an Ethernet switch control unit and a vehicle ECU multi-channel interface unit. The Ethernet switch control unit is connected to the vehicle networking module, the intelligent cockpit module and the vehicle ECU multi-channel interface unit. The internal data bus of the cross-domain gateway module is implemented based on the SOA signal-oriented architecture which can receive the internal connection communication of the aforementioned module and can verify and transmit the requests from the aforementioned module to achieve cross-domain communication. In the present embodiment, the vehicle ECU multi-channel interface unit further comprises a vehicle Ethernet interface connected to the Ethernet switch control unit, a first CAN interface connected to the vehicle networking module, and a second CAN interface connected to the intelligent cockpit module. The vehicle ECU multi-channel interface unit is connected to the in-vehicle control terminal. Therefore, the cross-domain gateway module of this embodiment can support a more flexible high-speed communication network interface by combining the Ethernet communication method and the CAN communication method to facilitate collaborative sensing of information dynamics with vehicles and roads in the autonomous driving domain. In addition, the intelligent cockpit system also allows external intelligent driving domain controllers to directly connect to the cross-domain gateway module through the vehicle Ethernet to obtain roadside sensing data for vehicle-road collaboration decision-making.

In the present embodiment, the Ethernet switch control unit adopts a 5-port Ethernet switch processor to implement the intelligent network connection between the vehicle networking module and the intelligent cockpit module through the transmission protocol of the Ethernet switch control unit in the vehicle, and performs high-bandwidth data convergence transmission within the gateway in the information security domain and the open connection domain. Wherein, part of the vehicle Ethernet switch related to the intelligent network connection and the intelligent cockpit is configured in the information security domain and the open connection domain; part of the vehicle Ethernet switch related to the multimedia data communication is configured in the open connection domain; part of the vehicle Ethernet switch connected to the vehicle ECU multi-channel interface unit is configured in the open connection domain. Wherein, part of the vehicle Ethernet switch in the information security domain and the part of the vehicle Ethernet switch in the open connection domain are safely isolated from each other. In the present embodiment, the Ethernet switch control unit further comprises a first Ethernet processor unit and a second Ethernet processor unit. The first Ethernet processor unit is configured in the information security domain. The second Ethernet processor unit is configured in the open connection domain. Therefore, by setting up the first Ethernet processor unit and the second Ethernet processor unit, achieving the isolation between the information security domain and the open connection domain in the Ethernet communications.

Specifically, the Ethernet switch control unit is implemented by a 5-port automotive Ethernet switch that supports IEEE Audio Video Bridging (AVB) and Time Sensitive Networking (TSN) standards, with improved safety-related features, expanded interface options and conformed with ISO 26262 ASIL-A. Each port of the 5-port automotive Ethernet switch can be independently configured to operate at 10/100/1000 Mbit/s, built-in PHY function and support internal communication protocol conversion. Each port of the 5-port automotive Ethernet switch uses RGMII interface (1000 Mbit/s) to communicate with the vehicles, also can directly communicate with the intelligent cockpit module through the RGMII interface (1000 Mbit/s), and can support the ECU interface to expand the 3-way vehicle Ethernet interface.

In the present embodiment, the vehicle ECU multi-channel interface unit mainly includes a 3-channel vehicle Ethernet interface connected to the Ethernet switch control unit, some interface unit connected to the vehicle networking module such as a 4-channel CAN bus interface, a 1-channel LIN interface, a 2-channel RS-232 serial ports, a 4-channel y PPS output interface, a 1-channel ignition switch interface, a 4-channel digital input interface, a 4-channel digital output interface, a 1-channel brake detection input interface, a 1-channel airbag detection interface, and a 1-channel PPS synchronization input interface, and some interface unit connected to the intelligent cockpit module such as a 2-channel high-speed CAN bus interface, a 1-channel RS-232 serial port, a 2-channel microphone input interface, and a 4-channel audio output interface. The vehicle ECU multi-channel interface unit is used in combination with Ethernet and CAN to support more flexible high-speed communication network interfaces to allowing to connect with the automatic driving control terminal and the vehicle body control terminal of each in-vehicle control terminal or connect the vehicle body or dynamic with the chassis control terminal to achieve the integration between the Vehicle-road collaboration sensing data and decision.

Please refer to FIG. 4. FIG. 4 is a flow chart illustrating a vehicle control method according to the embodiment of the present invention. The vehicle control method of the present invention can be achieved by the vehicle control system M10 of FIG. 2. The vehicle control method includes the following steps of: step S100: collecting the external sensing data from the external devices through the vehicle networking module, and the internal sensing data from the internal sensing devices through the automatic driving control terminal by the intelligent cockpit module; step S200: calculating the external sensing data and the internal sensing data, generating the vehicle driving control data by the preset automatic driving algorithm model, and obtaining the vehicle driving control signal according to the vehicle driving control data by the intelligent cockpit module; and step S300: controlling the vehicle actuator according to the vehicle driving control signal by the vehicle body control terminal.

Wherein, in step S100, the external sensing data includes the data sensed by road side sensors; the internal sensing data includes the data sensed by radars, cameras, etc. In step S200, the automatic driving algorithm model includes AI algorithm models such as path planning model, vehicle steering control model, vehicle environment temperature control model, etc; the vehicle driving control data includes the data such as vehicle driving speed, vehicle steering angle, and vehicle seat adjustment angle, etc; the vehicle driving control signal includes the execution commands to the vehicle actuator which are corresponding to the control target, for example, when the control target is to turn the vehicle right, the execution command includes the steering motor, motor speed, motor starting time, etc.

Further, in step S200 of some embodiments, the intelligent cockpit module can perform data analysis by AI through the computing power expansion unit and the edge computing device of the roadside unit to obtain the vehicle driving control data.

Figure 5:
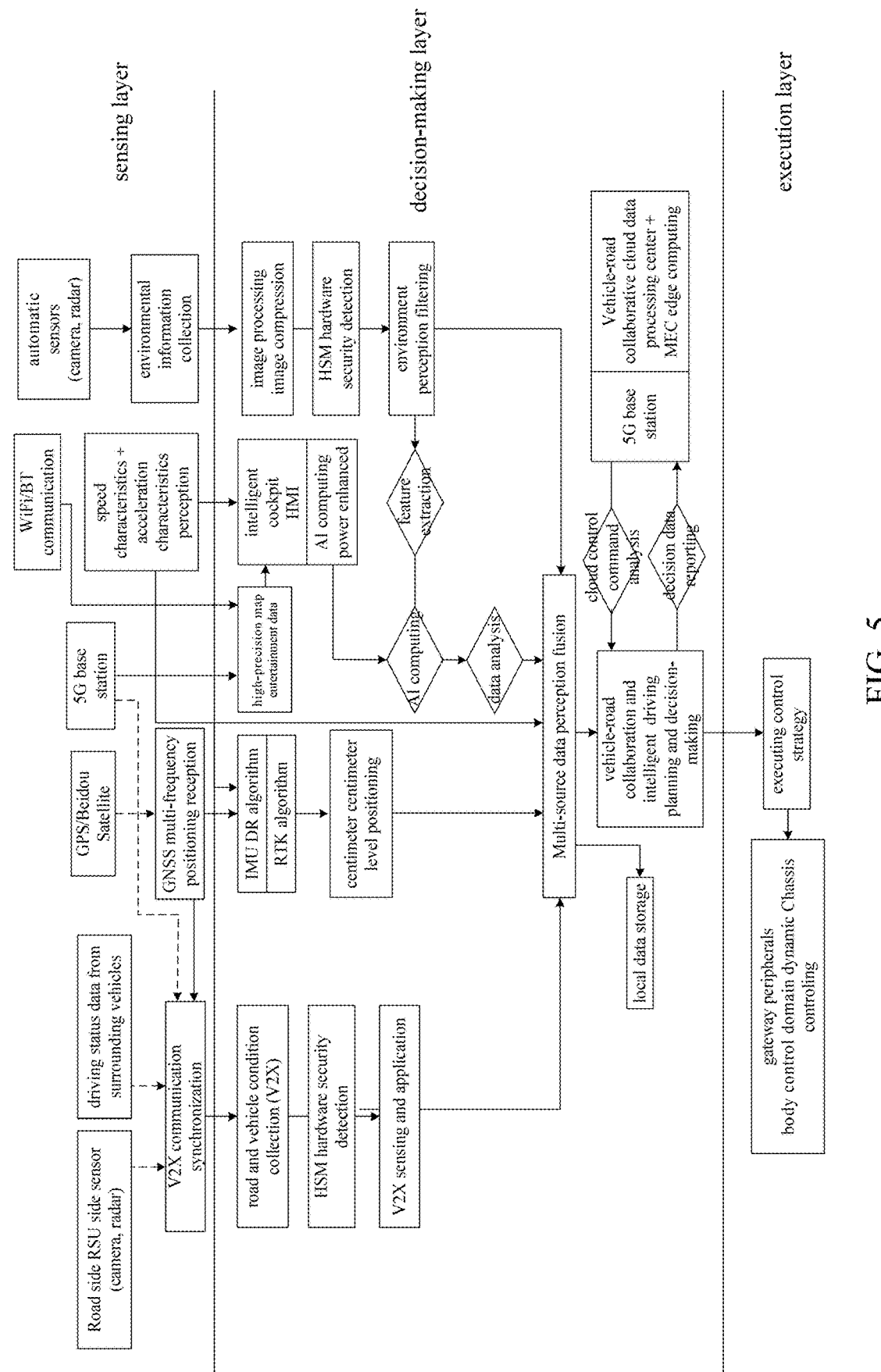
FIG. 5 is a flow chart illustrating a vehicle control through vehicle-road collaboration according to one embodiment of the present invention.

Please refer to FIG. 5. FIG. 5 is a flow chart illustrating a vehicle control through vehicle-road collaboration according to one embodiment of the present invention. Next, take a vehicle control process as an example to specifically describe the specific process implemented of the present invention. (1) The vehicle can transmits the data sensed by the road side sensor of the road side unit or the information of surrounding vehicles through the direct communication interface of the vehicle networking module, so as to obtain the real-time video image information such as pedestrian position, vehicle speed, driving direction, traffic condition. After the vehicle receives the external data, the vehicle-road collaboration data is directly transmitted to the intelligent cockpit module through the cross-domain gateway module, so as to achieve data synchronization through the PPS second pulse signal of the GNSS receiver. At the same time, the vehicle networking module can receive the real-time position of the vehicle by the RTK algorithm and DR algorithm, and the intelligent cockpit module performs multi-source fusion sensing data analysis to the vehicle to supplement the sensing dimension of the vehicle. (2) The vehicle can receive the traffic sensing data under the road sections without C-V2X communication by the own sensors (such as ultrasound device, radar, etc.) of the vehicle, and the auxiliary camera of the intelligent cockpit module.

Moreover, the vehicle can further execute detection, tracking, mapping, trajectory prediction, occupancy grid prediction and path planning by the AI computing algorithm model of the intelligent cockpit module, so as to achieve the deep integration of perception-prediction-decision-making processes and the application of automatic driving system. Wherein, the specific implementation of the steps can further include the following steps of:

(2.1): The intelligent cockpit module performs cluster analysis obtained from the vehicle driving status data and environmental data, and then divides it into self-driving vehicle motion characteristics, target motion characteristics, visual data characteristics and recognition data. Wherein, the automatic driving characteristics include speed characteristics of the vehicle and acceleration characteristics of the vehicle; the target motion characteristics include target driving speed characteristics and acceleration characteristics; the visual data characteristics are the visual data of the surrounding environment; the identification data is identification data about target type recognition;

(2.2): The intelligent cockpit module will extract the feature data and will obtain the driving motion status, target motion status, visual recognition data and associated confidence probability by the AI deep learning model;

(3): The intelligent cockpit module can instantly download high-precision maps by the vehicle networking module and displays them on the vehicle central control screen, and obtains various entertainment services from the cloud;

(4): The intelligent cockpit module and the edge computing device of the road side unit analyze and process the data obtained in step (1) to obtain the real-time position, distance and speed of vehicles and pedestrians. The edge computing device of the road side unit can further performs intent identification and trajectory prediction of pedestrians waiting on the roadside. Therefore, when the computing power of the central processor and computing power expansion unit in the intelligent cockpit module is limited, the V2X vehicle-road collaboration technology can shift the heavy computing tasks to the edge computing device of the road side unit and MEC edge computing from the big data processing center, so as to reduce computing burden of the entire vehicle;

(5): For the blind area of scene of the vehicle, the present invention can further uploaded the decision data to the vehicle-road collaborative cloud control platform through the interface method of the V2Xuu by the 5G/4G communication module of the vehicle networking module, and store the real-time position, distance and speed of vehicles and pedestrians transmitted from autonomous vehicles and roadside units, calculate the remaining arrival time of vehicles and pedestrians to the collision risk area, and analyze the decision;

(6): The vehicle-road collaborative cloud control platform uses MEC edge computing to calculate decision data by the big data AI model algorithm, and transmits the decision data back to the intelligent cockpit module and the road side unit by the vehicle networking module;

(7): The road side unit and the intelligent cockpit module obtain the vehicle driving control data according to the decision data or control instructions received from the vehicle-road collaborative cloud control platform and the data obtained by the road side unit or the intelligent cockpit module to further generate the vehicle driving control signal. Finally, the vehicle body control terminal controls the motion control unit of the automatic driving control terminal to execute the vehicle control instructions.

What is claimed is:

1. An intelligent cockpit system, comprising:

an intelligent cockpit module, configured across an information security domain and an open connection domain;

a vehicle networking module, configured to communicate with an external device through C-V2X network to collect an external sensing data from the external device, the external device having a road side unit, the vehicle networking module being configured across the information security domain and the open connection domain;

a cross-domain gateway module, respectively connected with the vehicle networking module and the intelligent cockpit module, the cross-domain gateway module being configured to communicate with an in-vehicle control terminal which has an automatic driving control terminal and/or a vehicle body control terminal;

a computing power expansion unit; and an intelligent cockpit control unit, having an expansion slot for accommodating the computing power expansion unit, the intelligent cockpit control unit being configured to generate a vehicle driving control data which is calculated with the external sensing data from the vehicle networking module and a vehicle sensing data from an in-vehicle sensing device by a preset automatic driving algorithm model through the computing power expansion unit and obtain a vehicle driving control signal to the vehicle body control terminal;

wherein, the intelligent cockpit module is configured to communicate with the external device through the cross-domain gateway module and the vehicle networking module, and communicate with the in-vehicle control terminal through the cross-domain gateway module.

2. The intelligent cockpit system of claim 1, wherein the vehicle networking module further comprises a vehicle networking communication control unit and a WiFi/BT module unit, the vehicle networking communication control unit further comprises a 5G/4G communication module and an MCU controller.

3. The intelligent cockpit system of claim 1, wherein the vehicle networking module further comprises a GNSS receiver and an IMU sensor, the vehicle networking module is configured to collect a carrier wave phase signal from the GNSS receiver and an IMU measurement data from the IMU sensor, and to calculate the carrier wave phase signal and the IMU measurement data by an RTC algorithm and a DRIMU positioning algorithm to obtain a current position of the vehicle.

4. The intelligent cockpit system of claim 1, wherein the vehicle networking module further comprises an HSM encryption module and a vehicle networking communication control unit, the HSM encryption module is configured in the information security domain and connected to the vehicle networking communication control unit.

5. The intelligent cockpit system of claim 1, wherein the intelligent cockpit control unit is configured to receive a calculation result data sent from the road side unit through the vehicle networking module, the intelligent cockpit control unit is configured to generate the vehicle driving control data according to the calculation result data, and to generate the driving control signal according to the vehicle driving control data to the vehicle body control terminal.

6. The intelligent cockpit system of claim 1, wherein the cross-domain gateway module further comprises an Ethernet switch control unit and a vehicle ECU multi-channel interface unit, the Ethernet switch control unit is connected to the vehicle networking module, the intelligent cockpit module and the vehicle ECU multi-channel interface unit, the Ethernet switch control unit further comprises a first Ethernet processor unit and a second Ethernet processor unit, the first Ethernet processor unit is configured in an information security domain and the second Ethernet processor unit is configured in an open connection domain.

7. The intelligent cockpit system of claim 6, wherein the vehicle ECU multi-channel interface unit further comprises a vehicle Ethernet interface connected to the Ethernet switch control unit, a first CAN interface connected to the vehicle networking module, and a second CAN interface connected to the intelligent cockpit module, the vehicle ECU multi-channel interface unit is connected to the in-vehicle control terminal.

8. A vehicle control system, comprising:

the intelligent cockpit system of claim 1;

an automatic driving control terminal, connected to the cross-domain gateway module; and a vehicle body control terminal, connected to the cross-domain gateway module.

9. A vehicle control method, according to the vehicle control system of claim 8, comprising the following steps of:

collecting the external sensing data from the external devices through the vehicle networking module, and the internal sensing data from the internal sensing devices through the automatic driving control terminal by the intelligent cockpit module;

calculating the external sensing data and the internal sensing data, generating the vehicle driving control data by the preset automatic driving algorithm model, and obtaining the vehicle driving control signal according to the vehicle driving control data by the intelligent cockpit module; and controlling the vehicle actuator according to the vehicle driving control signal by the vehicle body control terminal.

* * * * *